(12) United States Patent
Valero Lafuente et al.

(10) Patent No.: US 9,909,449 B2
(45) Date of Patent: Mar. 6, 2018

(54) WIND TURBINE

(75) Inventors: Sebastian Valero Lafuente, Cornellà de Llobregat (ES); Javier Bescos, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 601 days.

(21) Appl. No.: 14/005,540

(22) PCT Filed: Mar. 30, 2012

(86) PCT No.: PCT/EP2012/055766
§ 371 (c)(1),
(2), (4) Date: Sep. 16, 2013

(87) PCT Pub. No.: WO2012/131025
PCT Pub. Date: Oct. 4, 2012

(65) Prior Publication Data
US 2014/0010665 A1   Jan. 9, 2014

Related U.S. Application Data

(60) Provisional application No. 61/543,022, filed on Oct. 4, 2011.

(30) Foreign Application Priority Data

Mar. 31, 2011   (EP) .................................... 11382090

(51) Int. Cl.
| | |
|---|---|
| F03D 11/00 | (2006.01) |
| F01D 25/14 | (2006.01) |
| F03D 80/00 | (2016.01) |
| F03D 1/06 | (2006.01) |
| F03D 80/60 | (2016.01) |

(52) U.S. Cl.
CPC ........... *F01D 25/14* (2013.01); *F03D 1/0691* (2013.01); *F03D 80/00* (2016.05); *F03D 80/60* (2016.05); *F05B 2220/7066* (2013.01); *F05B 2240/61* (2013.01); *F05B 2260/64* (2013.01); *Y02E 10/725* (2013.01); *Y02E 10/726* (2013.01)

(58) Field of Classification Search
CPC .......... F03D 11/00; F03D 11/028; F03D 9/00; F05B 2260/64; Y02E 10/726; Y02E 10/722
USPC ...................................... 290/55, 44
See application file for complete search history.

(56) References Cited

U.S. PATENT DOCUMENTS

| | | | |
|---|---|---|---|
| 4,757,211 A | 7/1988 | Kristensen | |
| 6,676,122 B1 * | 1/2004 | Wobben | ................ F03D 9/002 |
| | | | 290/44 |

(Continued)

FOREIGN PATENT DOCUMENTS

| | | |
|---|---|---|
| DE | 102004007763 | 9/2005 |
| DE | 102004030929 B3 | 10/2005 |

(Continued)

*Primary Examiner* — Woody Lee, Jr.
*Assistant Examiner* — Maxime Adjagbe
(74) *Attorney, Agent, or Firm* — Dority & Manning, P.A.

(57) ABSTRACT

Wind turbine comprising a rotor having a hub carrying one or more blades, an air intake and a nacelle, the hub being rotatably mounted on a frame and the frame extending forward into the hub, wherein an air flow passage is provided between an inside portion of the hub and the nacelle via at least one first opening to the hub.

13 Claims, 8 Drawing Sheets

(56) References Cited

U.S. PATENT DOCUMENTS

| | | | |
|---|---|---|---|
| 7,837,126 B2 * | 11/2010 | Gao | ........................ F03D 80/00 |
| | | | 236/44 C |
| 2008/0207389 A1 | 8/2008 | Fahrenbach et al. | |
| 2008/0272604 A1 * | 11/2008 | Versteegh | ............. F03D 1/0666 |
| | | | 290/55 |
| 2010/0176600 A1 * | 7/2010 | Pabst | ..................... H02K 1/278 |
| | | | 290/55 |
| 2010/0264664 A1 * | 10/2010 | Lauke | ................. F03D 11/0008 |
| | | | 290/55 |
| 2012/0074709 A1 * | 3/2012 | Cole | ........................ H02K 1/32 |
| | | | 290/55 |

FOREIGN PATENT DOCUMENTS

| | | |
|---|---|---|
| DE | 102008063783 | 6/2010 |
| EP | 0864748 | 9/1998 |
| EP | 1 375 913 A1 | 1/2004 |
| EP | 2034181 | 3/2009 |
| EP | 2172647 | 4/2010 |
| ES | 2163362 | 1/2002 |
| WO | WO 01/59296 | 8/2001 |

* cited by examiner

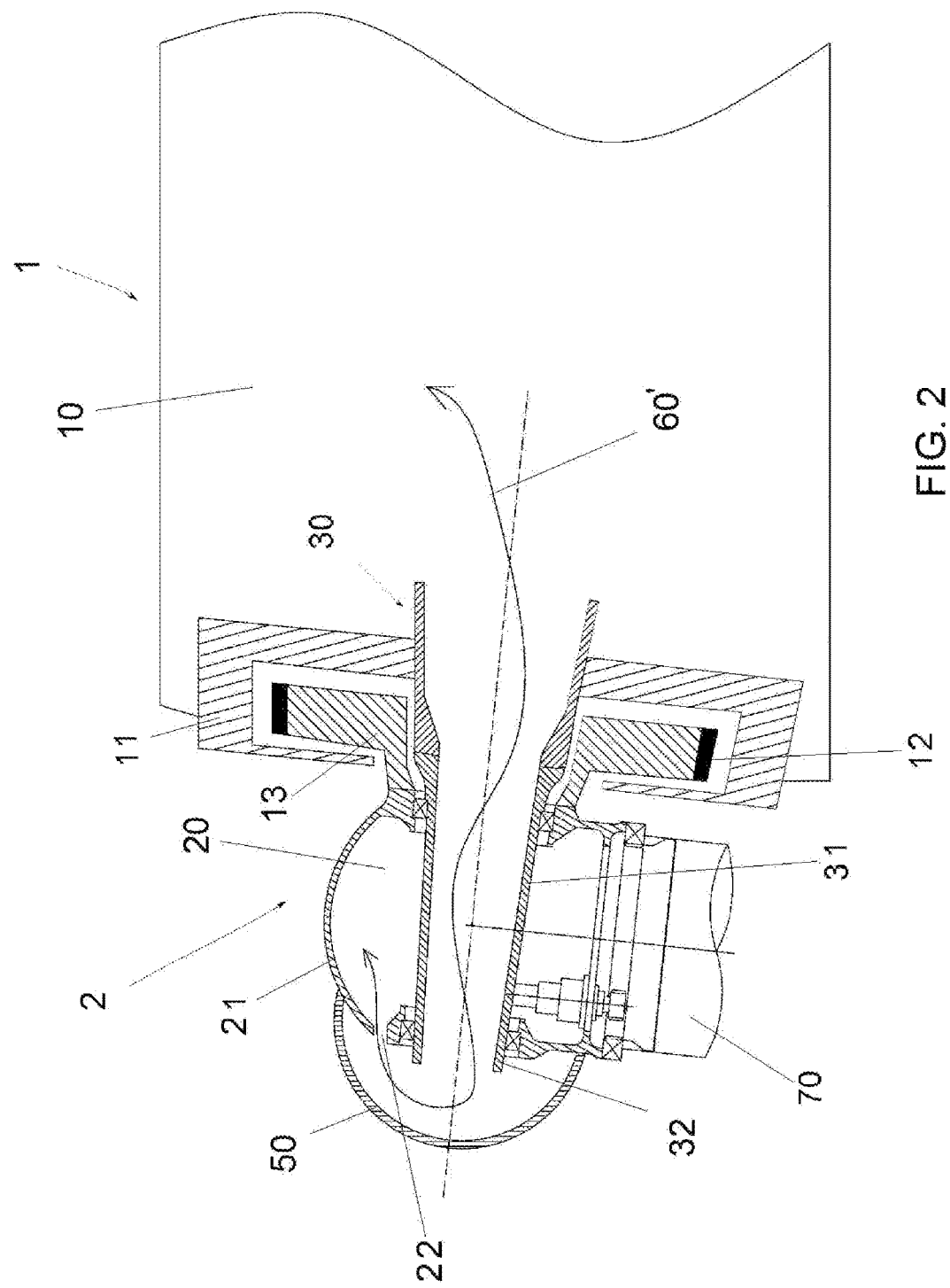

WIND TURBINE

This application claims the benefit of European Patent Application EP 11382090.6 filed on Mar. 31, 2011 and U.S. Provisional Patent Application Ser. No. 61/543,022 filed on Oct. 4, 2011.

The present invention relates to a wind turbine and more particularly to a wind turbine comprising a hub rotatably mounted on a frame extending forward into the hub.

BACKGROUND ART

Modern wind turbines are commonly used to supply electricity into the electrical grid. Wind turbines generally comprise a rotor with a rotor hub and a plurality of blades. The rotor hub is set into rotation under the influence of the wind on the blades. The rotation of the rotor shaft drives the generator rotor either directly ("directly driven") or through the use of a gearbox.

In most conventional wind turbines, the rotor hub is mounted on one end of the rotor shaft. The rotor shaft is rotatably mounted in a support structure inside the nacelle and the nacelle is rotatably mounted on top of a wind turbine tower.

The hub and nacelle may comprise complex mechanical and electrical equipment that can produce heat during operation e.g. pitch motor and generator respectively. It is generally desirable to avoid heating up of these components.

Also, especially during winter, it may happen that components of a wind turbine (e.g. components using lubricants) may need to be heated up before starting if the wind turbine has been motionless for some time due to e.g. maintenance. In these cases, heaters may be used.

Reliable operation of various components housed inside the hub and/or the nacelle may require certain specific temperature and/or humidity ranges. In order to keep temperatures at desired ranges, special ventilators, fans, or other air conditioning systems may typically be provided inside the nacelle.

This is of special importance in offshore wind farms for which outside conditions may be extreme.

Document WO0159296 discloses a direct drive wind turbine comprising a hub with a plurality of blades, the hub being rotatably mounted relative to an axle part.

Document ES2163362 describes a wind turbine tower with a frame comprising a portion extending forward into the hub. The rotor hub with its plurality of blades is rotatably mounted upon said portion of the frame. The rotor hub is coupled to a rotor shaft arranged within said frame.

In these kinds of configurations, the hub and the nacelle are substantially separate, closed spaces. In these configurations, in order to guarantee proper air conditioning of the hub, (which may involve heating, cooling, pressure and/or humidity control), additional air treatment devices such as fans, filters, air dampers, or dehumidifiers may typically be provided inside the hub. However, this is an expensive solution and may be complicated as this kind of equipment takes up room in an inherently compact space such as e.g. the rotor hub.

SUMMARY OF THE INVENTION

It is an object of the present invention to at least partially overcome some of the above mentioned drawbacks.

In a first aspect, the invention provides a wind turbine comprising a rotor having a hub carrying one or more blades, an air intake and a nacelle, the hub being rotatably mounted on a frame and the frame extending forward into the hub, wherein an air flow passage is provided between an inside portion of the hub and the nacelle via at least one first opening to the hub.

According to this aspect, an air flow may be established between an inside portion of the hub and an inside portion of the nacelle. Exchange of air between the inside of the hub and the inside of the nacelle may thus be ensured. With such air exchange proper air conditioning of components housed in the hub may be attain without the need for additional air conditioning treatment devices.

In general terms, it should be understood that a conditioned air flow may refer to either a cooled air flow, a heated air flow, or cleaned and/or dried air flow without any cooling or heating treatment.

In some embodiments, the wind turbine may further comprise a rotor shaft operatively coupled with the hub and arranged at least partially, inside the frame. Such a rotor shaft may be arranged to drive a generator or constitute an input shaft of a gearbox.

In some of these embodiments, the rotor shaft may be connected to a front part of the hub via a coupling element.

In other embodiments, the rotor may be directly coupled to a generator arranged around the frame.

In some embodiments, the first opening to the hub may be arranged in a portion of the frame extending forward into the hub. In others, it may be arranged in a front portion of an external wall of the hub. Said front portion may be enclosed inside the spinner of the wind turbine.

In some embodiments comprising a coupling element connecting the rotor shaft to a front part of the hub, said coupling element may comprise at least one opening to the spinner. In others, the rotor shaft may comprise an air flow passage therethrough.

In some embodiments wherein the wind turbine rotor is directly coupled to a generator arranged around the frame, the distal end of the frame may comprise a partition. Optionally, said partition may comprise an opening. In yet further embodiments, the distal end may be open.

In some embodiments, the hub may comprise a substantially tubular inner stiffening structure coaxially arranged around the portion of the frame extending forward into the hub between a front end and a rear end of the hub.

In some embodiments, the stiffening structure may comprise a second opening to the hub.

In some embodiments wherein the wind turbine is directly coupled to a generator arranged around the frame and the first opening to the hub is arranged in a portion of the frame extending forward into the hub, the first opening to the hub may be large enough so that an average-size adult human can further gain access to the hub. Such a first opening to the hub may be arranged in an upper side of the portion of the frame extending forward into the hub. In these embodiments, this first opening to the hub, provided for air conditioning purposes, may also be used as an access for maintenance purposes and service personnel may reach the inside of the hub without having to go outside the nacelle.

In some embodiments, the air intake may be arranged in the nacelle or in the wind turbine tower. In others, it may be arranged in an external wall of the hub.

When the air intake is arranged in the nacelle and the wind turbine further comprises an air conditioning system housed inside the nacelle, the conditioned air flow generated can further be used for cooling and/or heating of auxiliary systems provided inside the hub via the first opening to the hub. Therefore, additional air treatment devices such as filters, fans, air dampers, dehumidifiers, etc. provided inside the hub may be avoided or significantly reduced and the hub may not require additional air intakes and filters (which may complicate the design and manufacture of the rotor hub). This may be of particular importance in offshore wind farms as no high salt content or humid air may come into contact with sensitive components arranged inside the hub. Thus, in embodiments of the invention the risk of corrosion may be reduced. A further aspect of such a configuration is that no additional electrical power has to be transferred from the nacelle to the rotor hub through, e.g. slip rings.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 2 illustrates a fourth embodiment of the present invention;

DETAILED DESCRIPTION OF EMBODIMENTS OF THE INVENTION

Figure 1A:
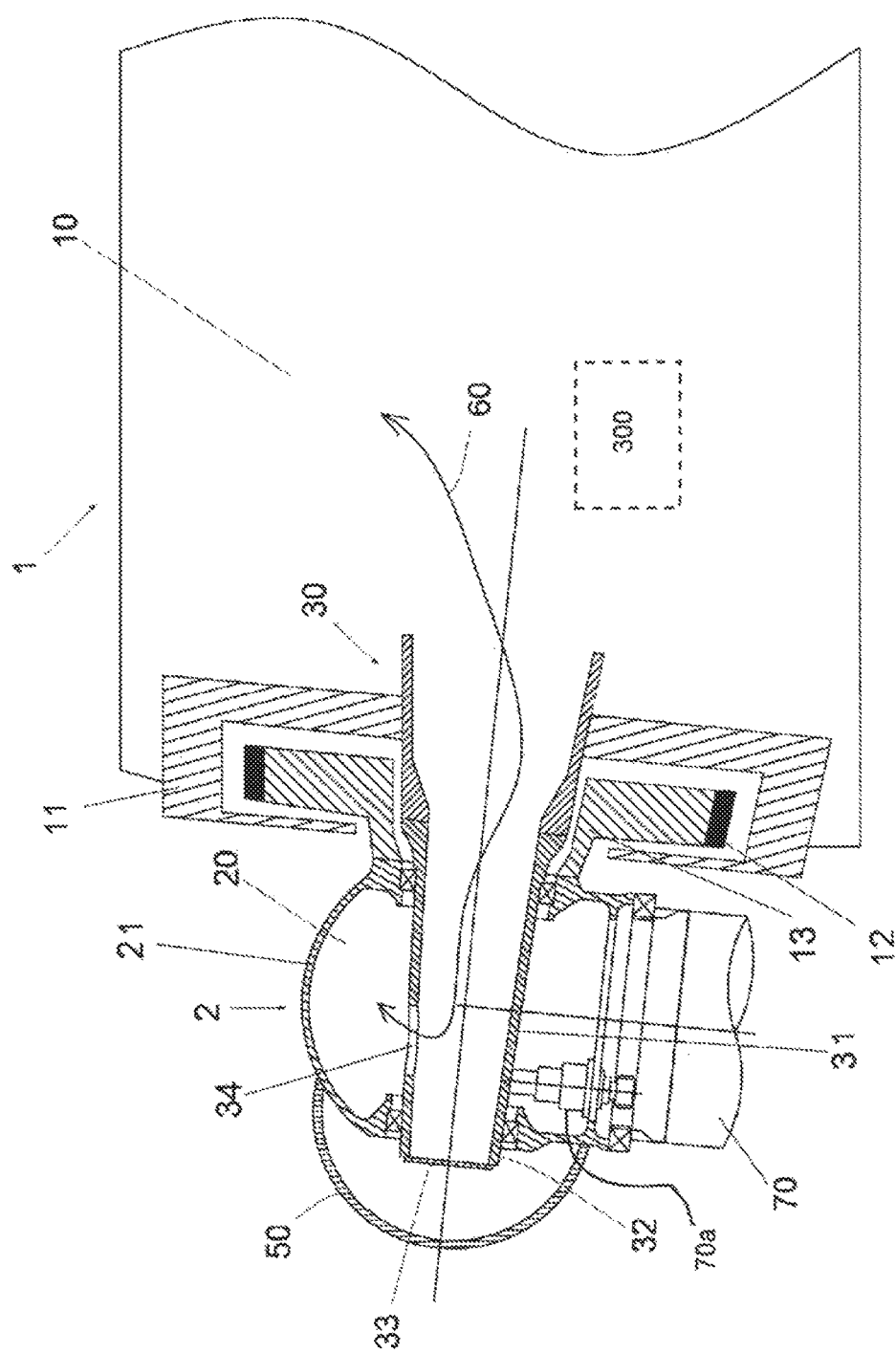
FIG. 1a illustrates a cross-section of a wind turbine according to a first embodiment of the present invention.

FIG. 1a illustrates a cross-section of a wind turbine according to a first embodiment of the present invention. The wind turbine comprises a wind turbine rotor having a hub 2 carrying at least one blade 70 and a pitch motor 70a. The wind turbine furthermore comprises a nacelle 1 housing at least a generator stator 11 and a generator rotor. The hub 2 is rotatably mounted on a frame 30. The hub 2 may be directly coupled to a carrying structure 13 of the generator rotor. Said carrying structure may carry e.g. permanent magnets 12. In this example, two bearings are shown enabling the rotation of the rotor hub on the frame. Different kinds of bearings and bearing arrangements may however be used. As further shown in FIG. 1a, the frame 30 comprises a portion 31 that extends forward into the hub 2 between the two bearings respectively provided at the front and rear end of the hub.

The frame 30 may comprise a portion 31 extending forward into the hub 2. Said portion 31 may comprise a first opening 34 to the hub 2. Thus, an air flow passage 60 may be provided between an inside portion 10 of the nacelle 1 and an inside portion 20 of the hub 2.

The nacelle or the tower may house an air conditioning system 300, with an air intake and accompanying filters, dehumidifiers and/or air purifiers arranged in the tower or the nacelle. The air flow passage may permit the air to flow from the tower and/or the nacelle towards the inside of the hub.

As shown in FIG. 1a, the first opening 34 may be arranged in the portion 31 of the frame extending forward into the hub. The position of the first opening may vary widely within the scope of the present invention. In some embodiments, the first opening 34 to the hub may be provided beyond substantially half of the diameter of the hub 2. Depending on the size of the opening 34, it may form a manhole that allows access of maintenance personnel to the inside of the hub.

As further shown in FIG. 1a, the distal end 32 of the frame 30 may comprise a partition 33. In some embodiments, said partition may comprise an opening (not shown). In others, the distal end may be open (as shown in FIG. 2); in these cases, an air passage may also be established between the nacelle or tower and the spinner of the wind turbine.

In further embodiments, the same reference signs have been used to indicate the same parts or components.

Figure 1B:
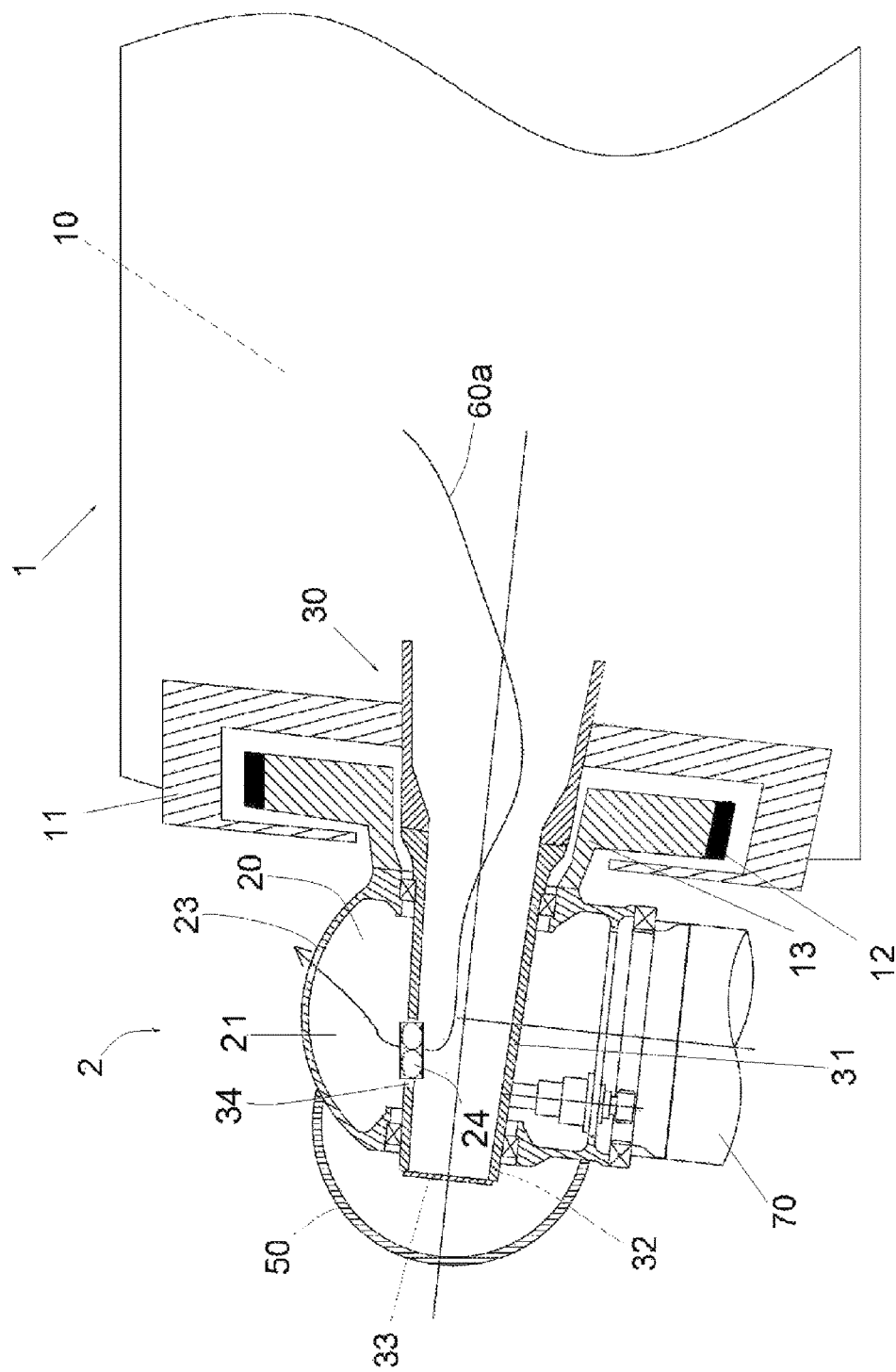
FIG. 1b illustrates a second embodiment of the present invention.

FIG. 1b shows second embodiment having a similar configuration as that shown in FIG. 1a, wherein a fan 24 is arranged in the first opening 34 to the hub and an air damper 23 is provided in an external wall 21 of the hub 2. In this embodiment, the fan 24 enforces the required air flow rate to flow from the inside portion 10 of the nacelle 1 to the inside portion 20 of the hub 2. Thus, air flow 60a coming from the inside portion 10 of the nacelle 1 enters the inside portion 20 of the hub 2 through the fan 24 and it further leaves the hub 2 through the air damper 23.

Instead of an air damper, a one way air outlet, a one way valve, a safety valve or an overpressure damper that allows air to exit the hub when the fan is activated but avoids external air to enter the hub may also be suitable. This kind of air outlet may further be provided with a suitable protection in order to prevent water from entering through it.

Figure 1C:
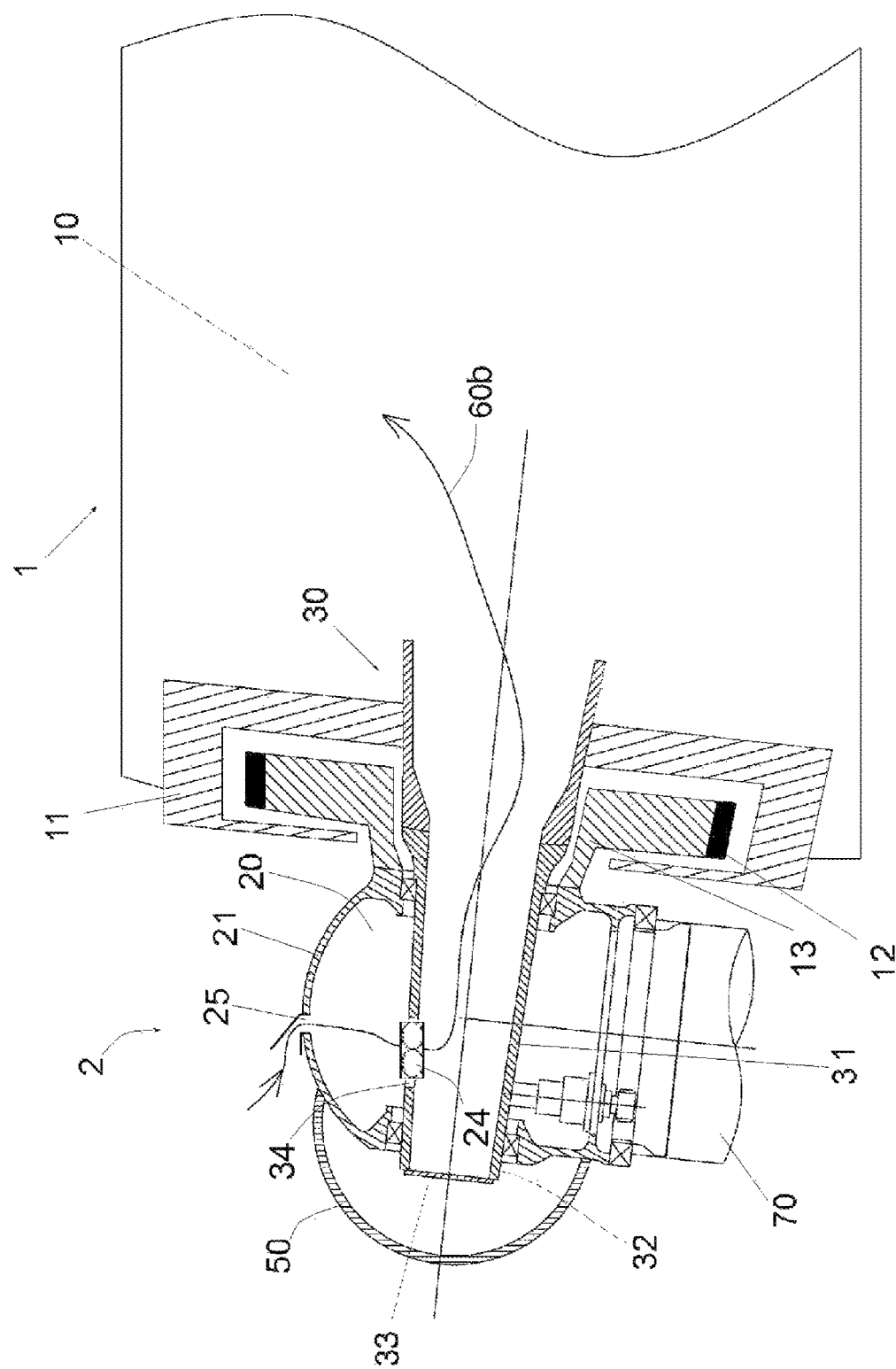
FIG. 1c illustrates a third embodiment of the present invention.

FIG. 1c shows a third embodiment having a similar configuration as that shown in FIG. 1a, wherein an air intake 25 is provided in an external wall 21 of the hub. With this alternative, air renewal is generated from the hub 2 towards the nacelle 1. In some embodiments, air filters, dehumidifiers and/or purifiers can be further provided in the air intake 25. With such a configuration external wind may be used to generate the require air flow 60b.

In the example of FIG. 1c, the arrangement may further comprise a fan 24 arranged in the first opening 34 to the hub for aiding the air flow 60b entering through the air intake 25 to flow towards the inside portion 10 of the nacelle 1.

In some embodiments, a fan (not shown) may further be placed inside the nacelle, for stimulating the air flow from the hub to the nacelle Placing a fan inside the nacelle avoids using space inside the hub (which is a smaller area) and may avoid any possible power supply problems of a fan placed inside the hub.

FIG. 2 shows a cross-section of a wind turbine according to a fourth embodiment of the present invention wherein the rotor hub 2 may be directly coupled to the generator rotor. According to this embodiment, the distal end 32 of the frame 30 may be open and a first opening 22 to the hub may be arranged in a front portion of an external wall 21 of the hub 2. Said front portion may be enclosed inside a spinner 50 of the wind turbine. This way, an air flow passage 60' may be provided between an inside portion 10 of the nacelle 1 and an inside portion 20 of the hub.

In some embodiments, the distal end of frame 30 may comprise a partition (similar to what was shown in FIG. 1) with at least one opening so as to establish a similar air flow passage.

The generator rotor may be coupled to the wind turbine rotor in various ways. In some embodiments, the coupling between the wind turbine rotor and generator rotor may be adapted to transmit torque while substantially limiting the transfer of bending loads.

Figure 3:
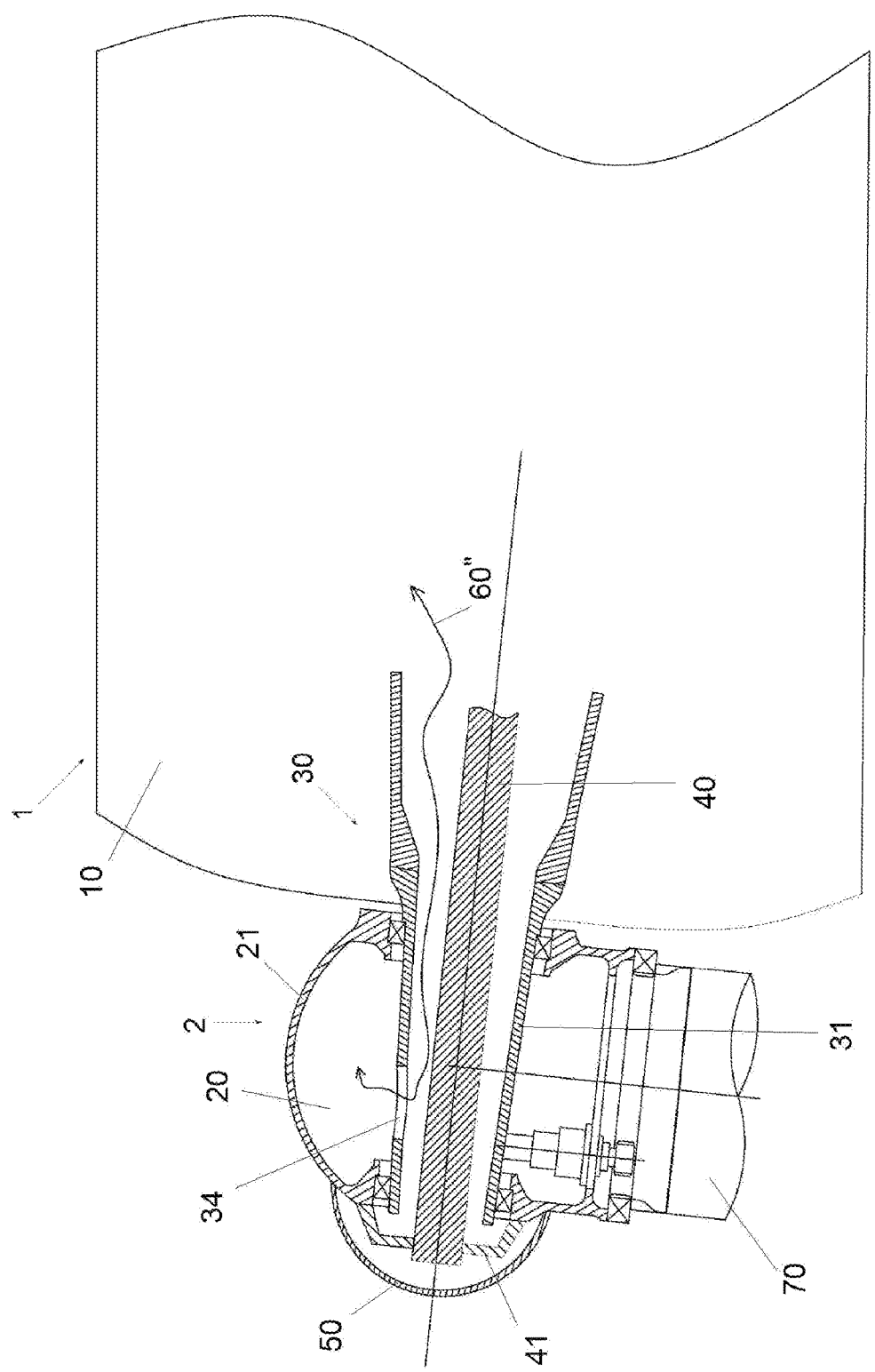
FIG. 3 illustrates a fifth embodiment of the present invention.

FIG. 3 shows a cross-section of a wind turbine according to a fifth embodiment of the invention comprising a rotor shaft 40 operatively coupled to the hub 2 via a coupling element 41. The rotor shaft 40 may be arranged partially inside the portion 31 of the frame 30 extending forward into the hub 2. A first opening 34 to the hub may be arranged in the portion 31 of the frame extending forward into the hub. Further in this embodiment, an air flow passage 60″ may be provided between the inside portion 10 of the nacelle 1 and the inside portion 20 of the hub 2.

The coupling element 41 may be enclosed inside the wind turbine spinner 50 and, as shown in FIG. 3, it may take the form of a circular disc.

In some embodiments, the coupling element may be adapted to transmit torque from the hub to the shaft while substantially limiting the transfer of bending loads into the shaft. Various possible embodiments of the coupling elements are described in more detail with reference to FIGS. 6a-6c.

The rotor shaft may be arranged to drive either a generator directly or to serve as an input shaft of a gearbox.

Figure 4:
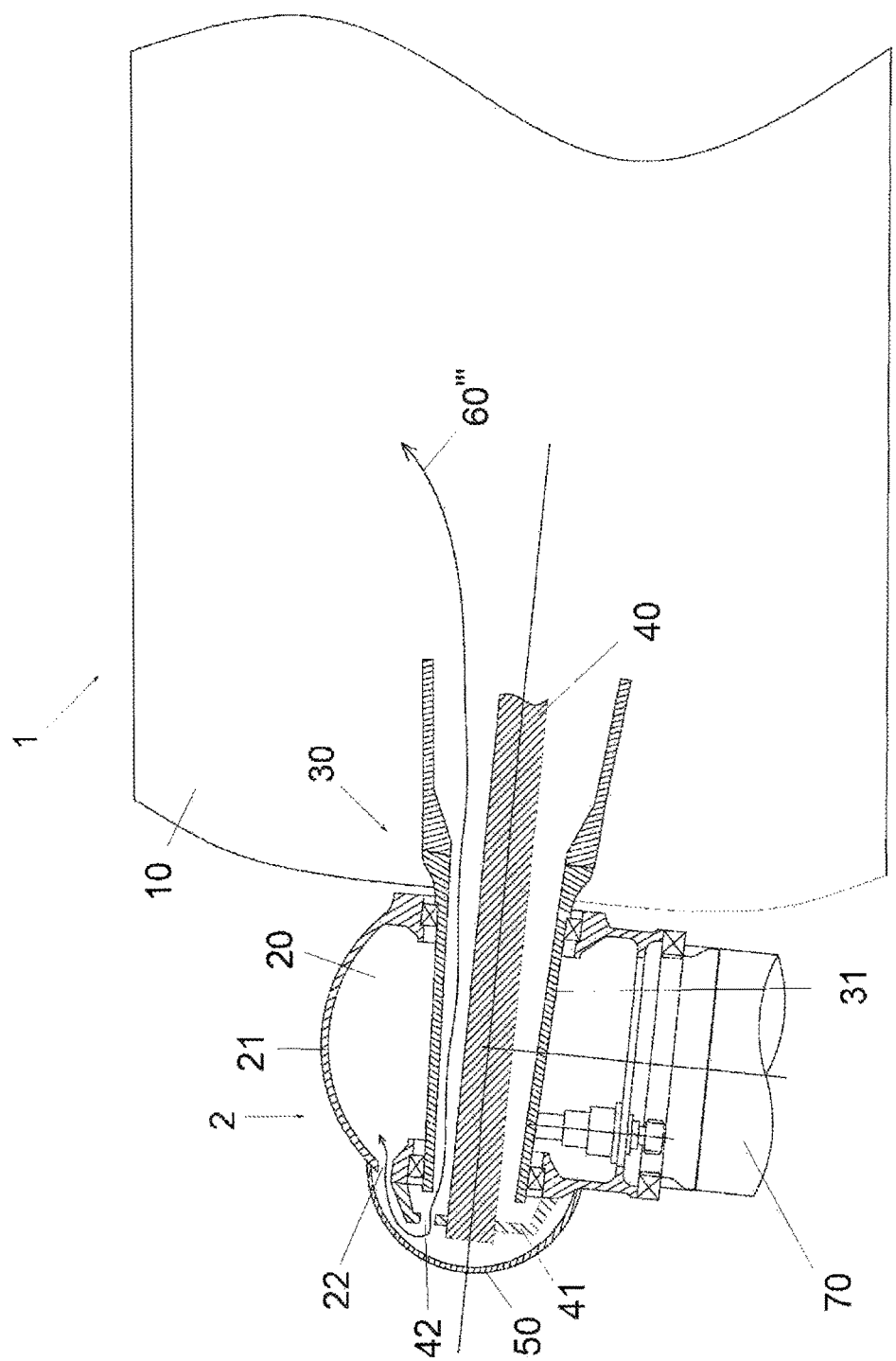
FIG. 4 illustrates a sixth embodiment of the present invention.

FIG. 4 shows a cross-section of a wind turbine according to a sixth embodiment of the invention comprising a rotor shaft 40 operatively coupled to the hub 2. The rotor shaft 40 may be axially arranged at least partially inside the portion 31 of the frame 30 extending forward into the hub. Further, the rotor shaft 40 may be connected to a front part of the hub 2 via a coupling element 41. The coupling element 41 may be enclosed inside the wind turbine spinner 50 and, as shown in FIG. 4, it may comprise at least one opening 42 to the spinner 50. A first opening 22 to the hub may be arranged in a front portion of an external wall 21 of the hub 2, enclosed inside the wind turbine spinner 50. This way, an air flow passage 60‴ may be provided between the inside portion 10 of the nacelle 1 and the inside portion 20 of the hub 2.

Figure 5:
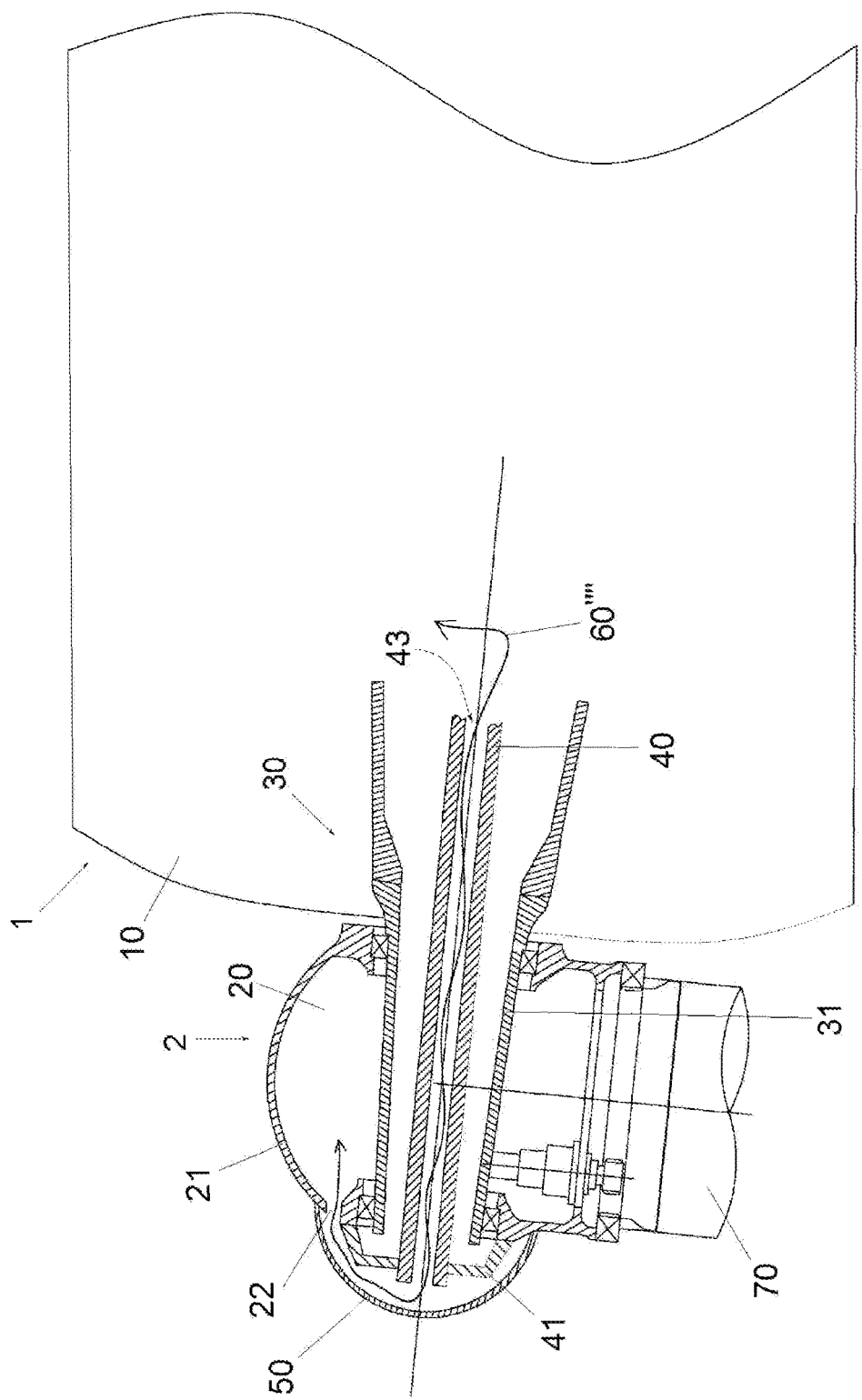
FIG. 5 illustrates a seventh embodiment of the present invention.

FIG. 5 shows a cross-section of a wind turbine according to a seventh embodiment of the invention comprising a rotor shaft 40 operatively coupled to the hub 2. The rotor shaft 40 may be arranged inside the frame 30. Further, the rotor shaft 40 may be connected to a front part of the hub 2 via a coupling element 41. The coupling element 41 may be enclosed inside the wind turbine spinner 50, a first opening 22 to the hub may be arranged in a front portion of an external wall 21 of the hub 2, enclosed inside the wind turbine spinner 50, and the rotor shaft 40 may comprise an airflow passage 43 therethrough. Thus, an air flow passage 60⁗ may be provided between the inside portion 10 of the nacelle 1 and the inside portion 20 of the hub 2.

As mentioned before, the nacelle or the tower may house an air conditioning system (not shown), such air conditioning system may be provided with an air intake and accompanying filters dehumidifiers and/or air purifiers. Thus, the air flow passage created according to these embodiments may permit the air to flow from the tower and/or the nacelle towards the inside of the hub.

In some embodiments, the rotor shaft may be a substantially hollow shaft. With a suitable coupling element and due to the arrangement of the hub on the frame, the transmission of bending loads from the rotor hub into the rotor shaft may be reduced. A substantially lighter tubular hollow shaft may thus be used in some embodiments. In others, a more conventional solid rotor shaft may be used that comprises a through-bore establishing an airflow passage.

In general terms, it should be understood that the shape of the first opening to the hub may vary and that also a plurality of openings may be provided.

It should be understood that the feature described with respect to the embodiment shown in FIG. 1b (fan in the first opening to the hub plus air damper) may also be suitable for the configurations shown in FIGS. 2-5. On the other hand, the feature described in the embodiment shown in FIG. 1c (fan in the first opening to the hub plus air intake in the external wall of the hub) may also be suitable for the configurations shown in FIGS. 2-5.

In general, a coupling element 41 as shown in FIGS. 3, 4 and 5 may be either a rigid coupling element or an elastic coupling element that is adapted to transmit mainly torque about the rotational axis of the hub and is generally arranged substantially perpendicular to the shaft. A coupling element may take various suitable forms. Some examples are illustrated in FIGS. 6a-6c.

Figure 6A:
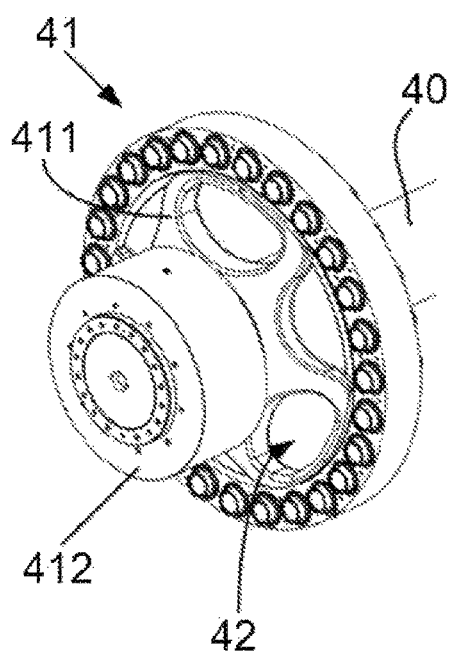
FIGS. 6a-6c schematically illustrate various embodiments of the coupling element between the front part of the hub and the rotor shaft which may be used in the different embodiments of the present invention.

FIG. 6a shows a coupling element 41 comprising a circular disc 411 provided with a plurality of holes 42 to provide access to the spinner. The coupling element may be mounted on the rotor shaft 40 using a shrink disc 412. The coupling element may be connected to the rotor hub with a plurality of bolts arranged in flexible bushings. The transmission of bending loads may thus be substantially reduced.

Figure 6B:
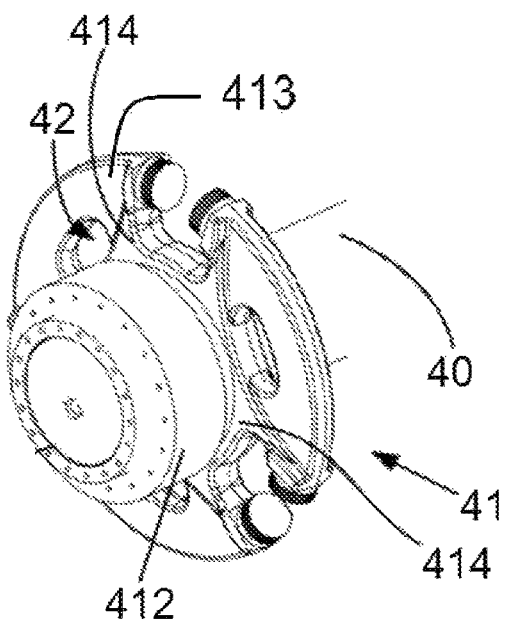

FIG. 6b shows another embodiment of a coupling element 41 that may be mounted on the rotor shaft 40 using a shrink disc 412. The coupling element may comprise a plurality of spokes 414 extending radially. Annular segments 413 with access holes 42 may be provided between the spokes 414. The hub may comprise a plurality of protrusions located between the distal ends of the spokes 414. Flexible elements (e.g. elastomers) may be arranged between the protrusions from the hub and the distal ends of the spokes. Also this flexible coupling may substantially limit the transfer of bending loads.

Figure 6C:
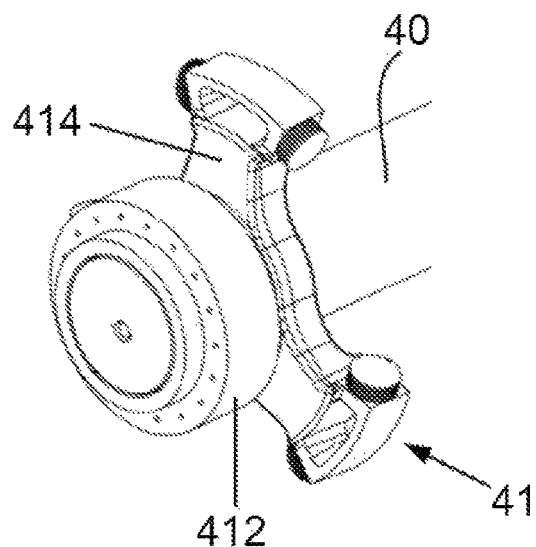

FIG. 6c shows a further embodiment for the coupling element 41 that may comprise a centre piece 412 mounted on the rotor shaft 40 and a plurality of radially extending spokes 414. Thus openings can be defined between the spokes. Also in this case, protrusions from the hub (or similar) may be connected to the spokes 414 using flexible elements.

Hence, the shape and precise location of the opening 42 to the spinner 50 shown in FIG. 4 may depend on the type of coupling element used. The various coupling elements shown in FIGS. 6a-6c would all allow the passage of air towards the spinner. It will be clear that within the scope of the present invention further different coupling elements may be used and may e.g. also comprise rigid couplings between hub and rotor shaft or generator.

In some embodiments the first opening to the hub may be provided with a grille, such a grille may be removably mounted and may serve as a protection, in order to avoid access to the hub. In some embodiments wherein the hub comprises a substantially tubular inner stiffening structure comprising a second opening to the hub, such a second opening may be further provided with a grille.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine comprising a rotor having a hub carrying at least one blade, the hub being rotatably mounted on a frame and the frame extending forward into the hub, wherein the wind turbine further comprises
   a nacelle,
   a generator within the nacelle,
   the frame extending into the nacelle, and the generator arranged around the frame,
   a tower, and
   an air intake arranged in the nacelle or in the tower, wherein
      an air flow passage is provided between an inside portion of the hub and the nacelle through the frame and via at least one first opening to the hub,
      the hub houses a pitch motor for the at least one blade,
      an air conditioning system is arranged in the nacelle or in the tower, and
      an external wall of the hub is provided with a one way air outlet that prevents external air from entering the hub and defines an opening in the hub for air from the flow passage to exhaust to ambient air wherein the air outlet is an air damper, one way valve, a safety valve or an overpressure damper.

2. The wind turbine according to claim 1, further comprising a rotor shaft operatively coupled with the hub, wherein the rotor shaft is arranged, at least partially inside the frame.

3. The wind turbine according to claim 2, wherein the rotor shaft is connected to a front part of the hub via a coupling element.

4. The wind turbine according to claim 1, wherein the first opening to the hub is arranged in a portion of the frame extending forward into the hub.

5. The wind turbine according to claim 3, wherein the first opening to the hub is arranged in a front portion of the external wall of the hub, the front portion being enclosed inside a spinner of the wind turbine and the coupling element comprises at least one opening to the spinner.

6. The wind turbine according to claim 2, wherein the first opening to the hub is arranged in a front portion of the external wall of the hub, the front portion being enclosed inside a spinner of the wind turbine and the rotor shaft comprises an air flow passage therethrough.

7. The wind turbine according to claim 1, wherein the first opening to the hub is arranged in a portion of the frame extending forward into the hub.

8. The wind turbine according to claim 7, wherein a distal end of the portion of the frame extending forward into the huh comprises a partition.

9. The wind turbine according to claim 1, wherein the first opening to the hub is arranged in a front portion of the external wall of the hub, the front portion being enclosed inside a spinner of the wind turbine and a distal end of the frame extending forward into the hub is open.

10. The wind turbine according to claim 4, wherein the first opening provided in the portion of the frame extending forward into the hub is arranged beyond substantially half of the diameter of the hub.

11. The wind turbine according to claim 7, wherein the first opening to the hub is large enough so that the hub is accessible to an adult human.

12. The wind turbine according to claim 1, wherein the air intake is arranged in the external wall of the hub.

13. The wind turbine according to claim 1, wherein the first opening to the hub is provided with a fan.

* * * * *